Figure 1:
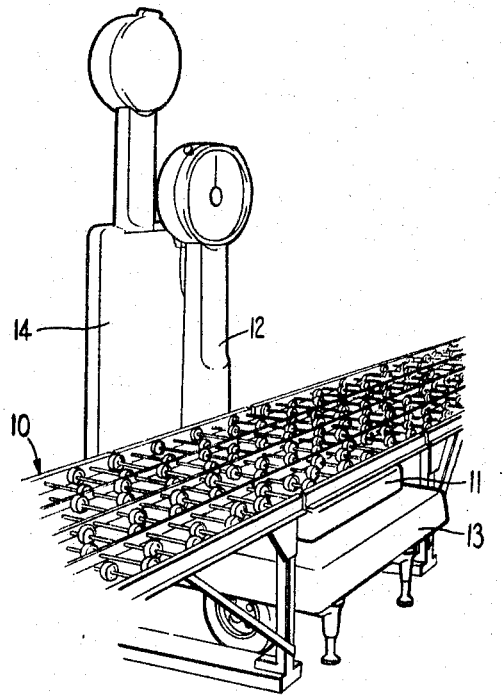

May 9, 1967   S. H. KENDRICK   3,318,402
WEIGHER WITH ERROR DETECTING SUPPLEMENTAL WEIGHER
Filed Dec. 9, 1964   2 Sheets-Sheet 1

Inventor
STANLEY HARRY KENDRICK

By
Cushman Darby & Cushman
Attorneys

Inventor
STANLEY HARRY KENDRICK
Attorneys

United States Patent Office 3,318,402
Patented May 9, 1967

3,318,402
WEIGHER WITH ERROR DETECTING SUPPLEMENTAL WEIGHER
Stanley Harry Kendrick, Brampton, Ontario, Canada, assignor to British Nylon Spinners Limited, Pontypool, England, a corporation of Great Britain
Filed Dec. 9, 1964, Ser. No. 417,057
Claims priority, application Great Britain, Dec. 17, 1963, 49,868/63
8 Claims. (Cl. 177—46)

This invention relates to measuring apparatus the output of which is an electrical signal, a characteristic of this signal varying in a predetermined manner with respect to the magnitude of the measured quantity, and is particularly although not exclusively applicable to weighing apparatus.

It is an object of the present invention to improve the control over the requisite measurements associated with a manufacturing process, by providing measuring apparatus capable of confirming automatically its own accuracy, within predetermined limits, of a measurement it has made. Such a procedure is of particular application when the associated apparatus is required to be extremely accurate and reliable in operation.

Another object of the invention is to provide measuring apparatus which will perform a desired measuring action at least twice independently, the apparatus then comparing the results so obtained, and indicating or recording the measured quantity, if the results are within predetermined limits of each other.

A further object of the present invention is to provide apparatus for recording the magnitude of the sensed quantity associated with discrete packages moving in a continuous but intermittent manner over a conveyor system (for example, apparatus for recording the weight of each package travelling over a conveyor), with greater reliability than was possible previously, the output of the apparatus being used for stock recording or invoicing purposes.

According to the present invention measuring apparatus the output of which is an electrical signal, a characteristic of this signal varying in a predetermined manner with respect to the magnitude of the measured quantity, comprises at least two measuring units, each unit being capable of performing independently the desired measuring action, a switching circuit for comparing the relevant characteristic of the electrical signals emitted from the units and, if the compared characteristics are within predetermined limits of each other, for feeding one of the electrical signals to an indicating or recording device.

Conveniently two measuring units are provided, and the apparatus comprises two weighing machines constituting these units, whereby the magnitude of a load on a support is converted into an electrical signal, a characteristic of which signal varies with the load detected.

In such a case, the load-bearing support of one machine may carry the support of the other machine. Thus both machines will sense simultaneously the load to be measured, and in one such arrangement the machines are pre-set to indicate zero load initially, and may be otherwise identical, so that the machines are capable of producing identical electrical signals to be compared.

Thus, the load is measured twice independently and the outputs of the two machines are compared, so that if one of the machines is not functioning correctly, and the compared signals are not within predetermined limits of each other, then the comparison of the electrical signal produced by that machine against the electrical signal of the other machine will mean that neither signal is indicated or recorded by the apparatus.

The comparing means may comprise a switching circuit including an INHIBIT gate which either allows or prevents one of the electrical signals from being fed to the indicating or recording device if the compared characteristics are respectively, within or outside the predetermined limits of each other.

The apparatus may include means for checking automatically the comparing action.

The measuring units also may be arranged to repeat automatically their sensing action.

Further, interlock and monitoring circuits may be included in the apparatus to ensure that the sensed measurement is recorded accurately after the comparing means has determined that the compared characteristics are within predetermined limits of each other.

Conveniently a visual or other form of alarm is included in the apparatus and is arranged to be initiated by the apparatus when it is malfunctioning.

In one form the data recording device comprises a punch-card device of known construction.

Measuring units according to the present invention may be included in a conveyor system. In such a form the measuring units may be arranged to sense the magnitude of the desired quantity associated with discrete objects moving in a continuous but intermittent manner over the conveyor system.

Figure 2:
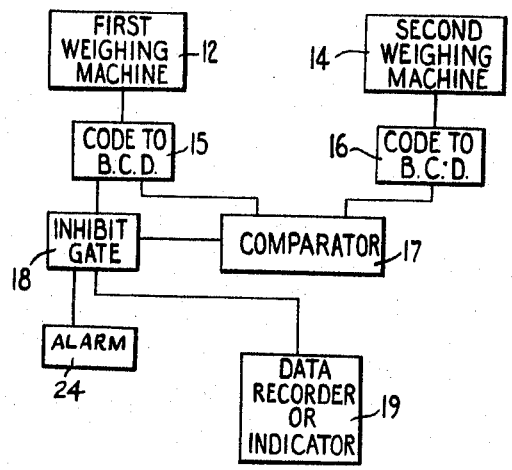
Figure 3:
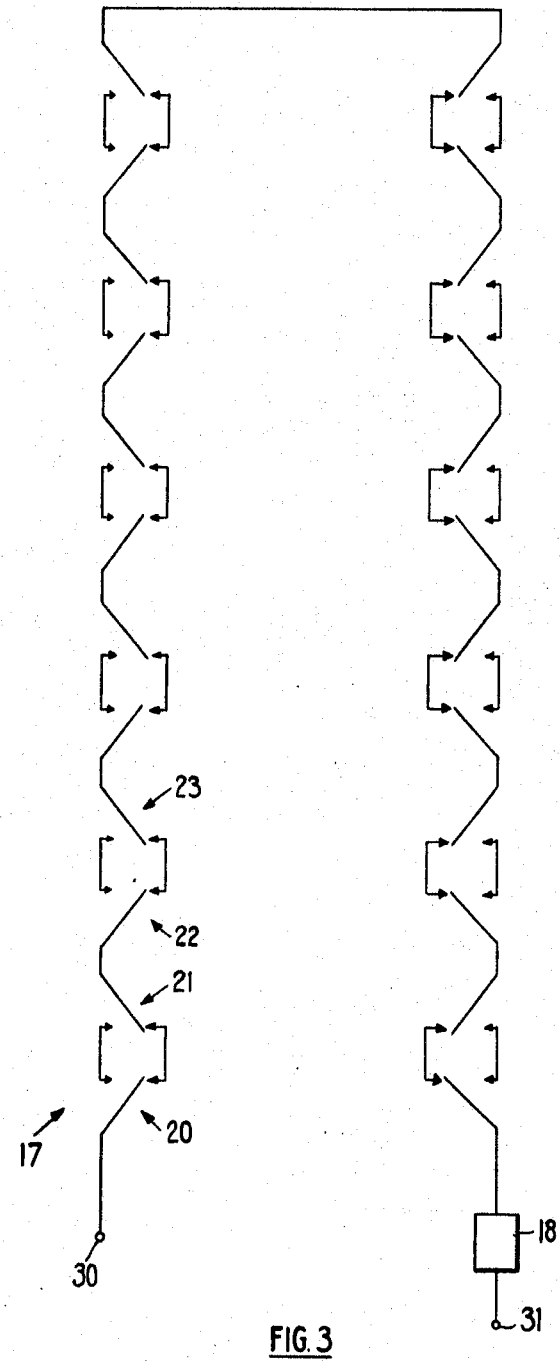

One arrangement of weighing apparatus will now be described by way of illustration but not limitation of the present invention, with reference to the accompanying drawings, in which FIGURE 1 shows two weighing machines arranged to weigh simultaneously each carton moving over a conveyor, FIGURE 2 is a block schematic diagram of the apparatus, and FIGURE 3 illustrates the comparator circuit.

The weighing apparatus is incorporated in a conveyor system 10, and along which conveyor pass cartons containing manufactured goods to be weighed. A brake device (not shown) is positioned in advance of the load-bearing support 11 of an electrical weighing machine 12, so that each container moving along the conveyor 10 is brought to rest before reaching the weighing machine 12, and until the weighing machine 12 is free to accept the next carton. The carton moves on to the support 11, when the brake is released by the operator, at the same time as he initiates the weighing cycle for this carton, the brake being caused to be re-applied eventually by the closing of a limit switch (not shown).

The support 11 of this weighing machine 12 is carried upon the support 13 of a second similar weighing machine 14, which is pre-set to zero when no carton is on the support 11 of the first weighing machine 12, and which machine 14 has no visual scale.

When any oscillation in the movement of the supports 11 and 13 is damped, the vertical displacement of each support, which is proportional to the load of the carton, causes an associated electrical bridge circuit to unbalance.

The output signal of each weighing machine, which machines include optical digitising devices, thus is decimal coded, and comprises three parallel components representing tens, units and tenths of a pound respectively.

FIGURE 2 illustrates in a schematic manner the electronic part of the weighing apparatus. The electrical signal output from each weighing machine 12 or 14 is recoded into a binary-coded-decimal electrical signal by a known form of electrical converter device 15 or 16 respectively.

Both converter devices are connected to a switching circuit 17 shown in FIGURE 3, and which compares each component of the signals.

If a discrepancy between the signals is detected, the apparatus causes an alarm to be initiated in the manner referred to below.

However, if the compared signals are found to be the same, the comparator circuit then initiates a pulse which is fed to an INHIBIT gate 18 comprising part of the comparator circuit 17, this pulse causing the gate 18 to allow the first machine 12 to be connected to a data indicating or data recording device, indicated generally at 19, and the operation of this device 19 to be initiated so that the signal can be recorded.

The comparator circuit 17 comprises 24 identical relays grouped in pairs. One member of each pair is coupled to one of a series of relays (not shown) arranged to be controlled by one weighing machine, and the other member of the pair is coupled to the corresponding relay associated with the other weighing machine. Thus, relays 20 and 21 indicated in FIGURE 3, are respectively coupled to the relays arranged to be actuated by the weighing machines when both indicate a weight including a value of 0.1 pound in the total, and their position is dependent on whether such a value is sensed or not, relays 22 and 23 are actuated when the weight sensed by both machines includes a value of 0.2 pound, and similarly for the other relays, up to a value of 80 pounds in the total.

If any discrepancy occurs between the outputs of the two weighing machines, for example a difference of the magnitude of 0.1 pound, or more, than at least two pairs of relays will not have both members in the same position simultaneously, and the circuit will not be completed from the terminal 30 to the terminal 31.

When the output signals of the two weighing machines are identical, and the comparator circuit 17 is completed, the INHIBIT gate 18, which may comprise a relay controlling the coupling of the first weighing machine 12 to the data recording device 19, is actuated, and the connection between the machine 12 and the device 19 is made.

The comparator circuit 17, thus ensures that if the values given by the two weighing machines 12 and 14 are within 0.1 pound of each other, then the value indicated by the first weighing machine 12 is recorded by the apparatus. Thus the accuracy of the apparatus is to within 0.1 pound of the mean value detected by the two weighing machines, each machine 12 or 14 weighing independently of the other.

In one arrangement the data recording device 19 comprises a punch-card device of known form, and the program of the cycle of operations to be performed by the apparatus may be stored within the programming unit associated with this punch-card device. Thus, this device serves to control the functioning of the remainder of the apparatus in accordance with such a predetermined program. By such means, synchronisation between the operation of the different components of the apparatus can be ensured, and the control device may be advanced in a step wise manner upon receipt of feed-back signals from the various components of the apparatus when they have completed their particular function in the cycle of operations (this stepwise advancement also causing the recording card to be advanced column by column).

Interlock and Monitoring circuits are included to ensure that the information processed and transmitted in this manner is accurate, and further, that a subsequent step in the cycle of operations is not started until a preceding step has been complete, or to ensure that the carton is not transferred from the supports of the weighing machines until its weight has been recorded and the punch card device causes the alarm to be initiated.

Thus, if the apparatus is not functioning properly, the punch-card device is arranged to stop the operation of the apparatus as a whole and to cause the alarm to be initiated.

Further, if a punch-card device is included in the apparatus, this device may be used to produce a duplicate of the card storing the measured information.

Each measuring action of the apparatus is arranged to be repeated before the production of such a duplicate card, and the value presented for recording on the duplicate card compared with the value recorded on the first card. If any discrepancy is detected, then an alarm 24 can be initiated and the entire measurement procedure repeated, after any fault in the apparatus has been rectified and the measuring cycle initiated by the operator.

The apparatus may be used in combination with an electronic calculating device, which may be in the form of a solid state logic circuit, whereby the tare weight of the carton being weighed can be fed separately into the apparatus and subtracted from the value detected by the weighing apparatus after this value has been checked. Thus either the net weight or the net weight and the gross weight can be transmitted to the indicating and recording device.

Interlock and monitoring circuits are included in the calculator circuit also.

In any event, if the indicating or recording apparatus includes a punch-card device, then cards produced, when associated with a continuous process, can be analysed statistically at infrequent intervals and conveniently, a duplicate card is used for this purpose. Any significant trend in the measurements made over one period, compared with the results recorded during a previous period may be shown in a manner also applicable when only one measuring unit is used.

It will be appreciated that, whilst using say, two measuring units, the frequency of the occasions of the apparatus malfunctioning is twice that of apparatus in which only one measuring unit is employed, the possibility of a unit producing an undetected incorrect signal is greatly reduced.

The support of each measuring unit, when comprising weighing machines, may be connected to a pointer moving over a visual scale by a conventional mechanical linkage, so that the weight indicated or recorded by the apparatus can be checked by an operator. This checking operation need be made only at infrequent intervals instead of at each weighing operation as would be desirable if only one electrical weighing machine was present, and the visual reading of the scale of an electrical or other type of weighing apparatus, particularly as a repetitive part of a manufacturing process, is subject to human error.

The output signal of the apparatus, either in serial or parallel form as required, may be fed to an electric typewriter, punch-carrd device, or other forms of data indicating or recording device, or combinations thereof.

The weighing apparatus described above is capable of being extremely accurate and reliable in operation, which is an important feature when the apparatus is to be used for the printing of invoices, or for use in the compilation of warehouse records. In addition, the time for each weighing cycle, i.e. the time required between the weighing of consecutive cartons on the conveyor, is relatively short, for example this period being 12 seconds.

The sensing elements of the weighing apparatus may comprise load cells. If measurements other than weighing are required to be made, this can be accomplished by use of suitable transducers each capable of converging the magnitude of the condition detected into a corresponding electrical signal, a characteristic of this signal being proportional to the magnitude of the sensed condition.

The measuring apparatus according to the invention is of particular application for recording or indicating measurements required to be made during a continuous manufacturing process, where the alternative method is to make these measurements by a repetitive manual operation. The accuracy of thte measuring apparatus can be checked easily, which is an important aspect when using electronic equipment, and includes automatic checking

What I claim is:

1. Weighing apparatus the output of which is an electrical signal, a characteristic of said signal varying in a predetermined manner with respect to the magnitude of the measured quantity, comprising at least two weighing machines for simultaneous weighing, each of said machines being capable of performing independently the desired measuring action, and comparing means for comparing said relevant characteristic of said electrical signals emitted from said machines and, if said compared characteristics are within predetermined limits of each other, for feeding one of said electrical signals to a data indicating device.

2. Weighing apparatus the output of which is an electrical signal, a characteristic of said signal varying in a predetermined manner with respect to the magnitude of the measured quantity, comprising at least two weighing machines for simultaneous weighing, each of said machines being capable of performing independently the desired measuring action, and comparing means in the form of a switching circuit including an INHIBIT gate, said comparator circuit comparing said relevant characteristic of said electrical signals emitted from said machines and, if said compared characteristics are within predetermined limits of each other, said gate being arranged to allow one of said electrical signals to be fed to a data indicating device.

3. Apparatus as claimed in claim 2 in which said data indicating device comprises a punch-card device.

4. Weighing apparatus comprising two weighing machines, the output of each of said machines being an electrical signal, a characteristic of said signal varying in a predetermined manner with respect to the magnitude of the sensed load, each of said machines being capable of performing independently the desired weighing action, the arrangement being such that the load-bearing support of one of said machines carries the support of the other of said machines, and comparing means for comparing said relevant characteristic of said electrical signals emitted from said machines and, if said compared characteristics are within predetermined limits of each other, for feeding one of said electrical signals to a data indicating device.

5. Apparatus as claimed in claim 4 in which said two weighing machines are substantially identical, and the arrangement is such that both machines are capable of producing identical electrical signals to be compared.

6. Apparatus as claimed in claim 4 in which said comparing means comprises a switching circuit including an INHIBIT gate, said gate being arranged to allow one of said electrical signals to be fed to a data indicating device if said compared characteristics are within predetermined limits of each other.

7. Apparatus as claimed in claim 4 in which said data indicating device comprises a punch-card device.

8. Apparatus as claimed in claim 4 including a conveyor system in which a load bearing support of one of said weighing machines forms a part.

References Cited by the Examiner

UNITED STATES PATENTS

| | | | |
|---|---|---|---|
| 2,076,617 | 4/1937 | Cleaves | 177—50 |
| 3,012,230 | 12/1961 | Galas et al. | 340—172.5 |
| 3,083,780 | 4/1963 | Swenson | 177—52 |
| 3,130,386 | 4/1964 | Barbagallo et al. | 340—146.1 |
| 3,235,714 | 2/1966 | Oliari et al. | 235—61.11 |

RICHARD B. WILKINSON, *Primary Examiner.*

H. B. KATZ, R. S. WARD, *Assistant Examiners.*